3,122,479
HEMOSTATIC SURGICAL DRESSINGS
David F. Smith, Newtown, Conn.
(120 Grove St., Bay Head, N.J.)
No Drawing. Filed Nov. 14, 1957, Ser. No. 696,340
10 Claims. (Cl. 167—84)

In my co-pending application, Serial No. 200,492, filed December 12, 1950, now U.S. Patent 2,914,444, of which this application is a continuation-in-part, are described Hemostatic Agents and Methods for Preparing Them. Such hemostatic agents comprise cellulose hydrogen sulfates, and cellulose glycollic acid ethers characterized by new physical forms and compositions which adapt them for use as hemostatic agents to arrest bleeding from wounds in the tissues of lower animals and humans. In addition I have discovered that hydroxyethyl cellulose glycollic acid ethers have similar properties. These agents also may be prepared so as to be completely absorbed in the tissues of such animals within 30 days' time.

Methods of preparing the acid ethers and acid sulfates of cellulose from which my hemostatic compositions are prepared have been described in my co-pending application, although I am not limited to such methods. For example, I have found the cellulose sulfate ester salts produced by the methods of U.S. Patents Nos. 2,539,451 and 2,675,377 also to be suitable materials for the preparation of my hemostatic agents, including material made by the methods of U.S. Patent No. 2,539,451 and containing 1 or more sulfate groups to 3 anhydroglucose units. I prefer, however, more highly substituted material than the former.

In using the cellulose hydrogen sulfate compounds I find that storage stability is improved if they are stored as described hereinafter and if they are not too highly acid; for example, I prefer their pH to be between 2.0 and 6.5 and preferably not below 2.5. The pH is controlled by control of the proportion of sodium salt, for example, left in combination with the acid form of the compound. Heat stabiilty and absorptive properties are also improved by incorporating with them a minor proportion of urea or other non-toxic water soluble material such as ascorbic acid. Non-toxic, water soluble salts can also be used to improve water wettability and absorption; indeed some of them such as NaCl, $Na_2SO_4$, $CaCl_2$ and $FeCl_3$—notably the latter two may even assist in clotting the blood.

It is especially necessary in order for my materials to efficiently function as hemostatic agents that they be wettable by aqueous liquids and, preferably, be absorbent so that they quickly absorb the blood into their structure and coagulate it therein and that they do not dissolve in the tissue fluids so rapidly that they quickly lose their form and their absorbency before the blood is clotted— say before about 5 minutes' contact. If they dissolve before the blood is clotted, as dissolved colloidal material they may even act as anticoagulants. When I speak of these materials' dissolving I actually mean dispersing since only the very low molecular weight materials outside the present scope of interest, form true solutions. By nature these materials are hydrophilic—in spite of which, by drying and/or heating they can be made hydrophobic. It is also desirable for their most efficient functioning as hemostatic agents that my materials be in a porous form, preferably that they exhibit capillary porosity. If they do not possess such porosity and contain so much water that they are not highly porous and that the active groups of the cellulose compounds are covered up or diluted by the water, their efficiency as blood coagulants is much reduced. On the other hand, if they are too dry they become brittle and thus cannot readily be conformed to the contour of the bleeding tissue and they break into pieces difficult to handle and to cover the bleeding tissue. This over-drying may also reduce the activity of the active groups in coagulating the blood, in a way similar to the way overdried absorbent cotton loses its affinity for water. While the mechanism of the coagulating action of my materials on blood is not understood in all its fundamental details, I have discovered that their wettability and moisture content and the physical state of my materials are all-important to their proper functioning. Wettability is, of course, easily determined by testing for capillary rise of aqueous media into their structure or by placing a drop of water on the material and determining whether its angle of contact with the surface is less than 90° of arc.

Due to the complex nature of these cellulose compounds, which vary in chain length of the anhydroglucose units, in the degree of substitution and also undoubtedly in extent of lactone ring formation and degree of cross-linking between the chains of anhydroglucose units, a simple determination of structure, composition or moisture content is not possible as a means of defining their efficiency as hemostatic agents. Indeed usual methods of moisture determination may lead to deep seated changes in their properties, composition and structure. It is therefore necessary to use empirical methods in defining the optimum physical condition and moisture content of these materials for use as absorbable hemostatic agents.

I have generally found, for example, that a cloudy or crazed appearance in films is indicative of porosity although some films that macroscopically appear clear are also highly effective. Brittleness is more evident in thicker films so that films that are too brittle when thick may be sufficiently flexible when they are thin. Thus the amount of water needed to plasticize the film sufficiently for my purposes is dependent upon its thickness and must be determined by trial.

When in the form of a sponge made by drying a solution in the frozen state, or a film, the cellulose glycollic acid ethers can be insolubilized so that they do not immediately collapse, shrivel or dissolve upon contact with blood or other aqueous media, by drying with heat, desiccation or contacting with dry non-aqueous solvents such as alcohol, acetone, etc. The cellulose hydrogen sulfates can also be made less soluble by heating in aqueous solution. The cellulose hydrogen sulfates in the form of films of 5 to 10 mils' thickness usually do not quickly shrivel upon contact with aqueous media; however in the form of a highly porous sponge made, for example, by freeze-drying a solution, they present so much surface that they may quickly collapse. It is thus important to control the surface area.

When dried to the proper moisture content as described, my materials may be stored, for example, in air-tight containers or, better, in an alcohol-water mixture containing usually between 85 and 95% ethyl or isopropyl alcohol so as to provide the proper moisture content in the material and to prevent substantial change in the described properties by absorption or release of water. Before use the material is removed from the alcohol-water mixture and allowed to dry a few minutes. Otherwise the original drying of the material may be done directly by contact with a similar alcohol-water mixture.

In order to improve their flexibility, my materials may include a minor proportion of propylene glycol, glycerin, sorbitol, polyglycol or other polyol. Sufficiently dry, stable forms of these hemostatic materials may be sterilized by heating. If heating is to be avoided, sterilization may be done at low temperature with formaldehyde or with ethylene or propylene oxide.

Porosity and wettability can also be achieved by exposing my materials alternately to moisture pick-up and to drying, so that the moist and swelled material is quickly dehydrated leaving a porous, water-wettable structure which presumably contains much amorphous cellulosic structure. An amorphous structure can also be achieved by hindering crystallization through admixture of foreign materials such as urea, ascorbic acid, salts of the acid ethers or acid sulfates of cellulose, non-toxic water-soluble salts such as NaCl, $Na_2SO_4$, sodium acetate, $CaCl_2$, $FeCl_3$, etc. In dehydrating my hemostatic compositions, especially those not containing foreign materials, I prefer to dehydrate rapidly in order to obtain good absorptive properties—presumably because this is conducive to amorphous rather than crystalline structure—for example, by vacuum drying or desiccation, freeze drying or contact with anhydrous solvents.

While the pH of my hemostatic materials is normally definitely on the acid side, I may vary the proportions of the cellulose glycollic acid ethers and their salts or of cellulose hydrogen sulfates and their salts so as to control the pH. I may also use mixtures of acid ethers and acid sulfates of cellulose, for example, to control solubility, pH and adherence to the tissues.

It is also possible to directly precipitate powder or fibrous materials from solutions of these acidic cellulose compounds, for example, by adding concentrated HCl or alcoholic HCl to the concentrated solutions of their salts. The moisture content of such precipitates can be controlled by controlling the water content of the precipitating solution. It is likewise possible to form threads or films of these materials by extrusion of their concentrated salt solutions into a strongly acid medium such as aqueous or alcoholic acid or of solutions of the acid forms into alcohol or alcohol-water solutions.

I have discovered another advantageous method of preparing my hemostatic materials as follows. The hemostatic agent is produced in the form of a powder, thin filaments or threads or shredded material dried as described herein. It is then formed into an absorbent film or sponge by bonding the material together without destroying its required properties, especially its absorbency. For example, I may use dried, powdered cellulose glycollic acid ether of medium to low viscosity type containing 1 to 1.5 acid groups per anhydroglucose unit and insolubilized by heating. This powder is bonded together by discrete particles of a suitable bonding material, but not by a solution of the bonding material, which would more or less completely cover the surface of the powder and/or fill its pores and thus reduce or destroy its absorbency and interfere with contacting the hemostatic agent with the blood. The bonding agent must be non-toxic and non-irritating and must be such as to absorb in the tissues. If it is a readily soluble colloidal material that will quickly dissolve in the blood and interfere with clotting, it must be used in minor proportion and, preferably, it should not be such a readily soluble colloidal material. The following examples will illustrate my methods in principle.

*Example 1*

10 grams of dry, powdered, heat treated cellulose glycollic acid ether of the medium viscosity type (made from the sodium salt sold by Hercules Powder Company and designated cellulose gum or CMC–120M) was mixed with 3 grams of powdered polyvinyl alcohol (sold by E. I. du Pont de Nemours and Company under the name Elvanol). The mixture was stirred a few minutes with a few milliliters of essentially anhydrous ethyl alcohol until the polyvinyl alcohol softened slightly and became adhesive but not excessively softened. The excess alcohol was then removed from the powder and the moist powder mixture formed into a sheet and dried. This film was strong, absorbent, flexible and had good hemostatic properties. The proportion of polyvinyl alcohol can be reduced further down to a few percent of the weight of the hemostatic agent. It can also be made adhesive by exposing it to water vapor or to contact with water-alcohol mixtures. The strength and flexibility of the film depends upon the proportion of bonding agent, the particle size of the powders and the degree of softening of the bonding agent. In any case, however, the polyvinyl alcohol must not be so greatly softened or dissolved as to largely cover the surface and/or block the capillary spaces of the hemostatic agent. Other bonding agents may be used in place of the polyvinyl alcohol; for example, hydroxyethyl cellulose glycollic acid ether or its sodium salt, methyl cellulose, hydroxypropyl methyl cellulose ether, a soluble type of cellulose glycollic acid ether (not heat treated or intensivey dried), sodium salts of cellulose glycollic acid ethers or of cellulose hydrogen sulfates. Instead of softening the bonding agent with alcohol they may be softened by moisture as in the case of methyl cellulose, by a suitable solvent as, for example, with hydroxypropyl methyl cellulose ether where a mixture of methylene chloride and methyl alcohol can be used. One skilled in the art will be able to obtain the desired result, namely an absorbent film or sponge comprising a hemostatic agent bonded with discrete particles of an adhesive material as described so that the surface and/or the capillary spaces of the hemostatic agent are not covered or blocked by the bonding agent. Also, the bonding may be accomplished by warming and pressing the mixture of hemostatic agent and bonding agent when the latter can be softened by warming. The bonding agent may also be softened by adding to it a non-toxic, tissue absorbent plasticizer such as polyglycol or other polyol; for example, hydroxypropyl methyl cellulose ether warmed with a small amount of propylene glycol may be used as a bonding agent which becomes adhesive when again warmed.

The just described procedure is, in fact, not limited to the use of the above described hemostatic agents, but may be advantageously applied to the oxycellulose hemostatic agent of U.S. Patent No. 2,232,990 by Yackel and Kenyon, issued February 25, 1941, wherein cellulose is oxidized by $NO_2$ under non-nitrating conditions to the point where its $CO_2$ equivalency is between about 13 and about 20 percent. The $CO_2$ equivalency closely approximates the carboxyl content and is a measure of the degree of oxidation of the cellulose since such oxidation produces carboxyl groups each of which yields a mol of $CO_2$ when boiled with hydrochloric acid. The latter hemostatic agent is now used in the form of surgical gauze or cotton batts (sheeted or carded cotton fibers). In order for the oxidized gauze or cotton to maintain its form and not become weak or brittle or crumble when handled, great care must be taken not to extensively or even fully oxidize the cellulose or to permit it to degrade by aging or warming. These limitations result in a product of non-uniform characteristics and particularly one which may be poorly absorbed in the tissues because of inadequate oxidation and/or degradation of the very insoluble cellulose; and furthermore the form of the product is not compact enough to dam up a bleeding area without the use of an excessive amount of material. As a result of these circumstances, its use in surgery is often followed by abscess formation due to excessive quantities of material left in the tissues and/or poor absorption. My methods as just described permit the use of an adequately oxidized and/or degraded cellulose in the form of an absorbent, compact sheet, film or sponge made as illustrated in Examples 2 and 3, below.

*Example 2*

Cotton surgical gauze oxidized by the method of U.S. Patent No. 2,232,990 and degraded by aging to the point where it became weak and brittle, was reduced to powder and shreds by crushing. 20 grams of the powder and shreds were mixed with 10 grams of polyvinyl alcohol powder and stirred a few minutes with a few milliliters of essentially absolute ethyl alcohol until the polyvinyl alcohol became adhesive but not excessively softened. The excess alcohol was removed and the moist powder mixture formed into a sheet and dried. A strong, absorbent, flexible sheet was produced which had good hemostatic properties and was readily absorbed in animal tissue. It is, of course, not necessary to use weak, brittle oxycellulose. A strong, flexible, absorbent product can be made by my methods using any type of oxycellulose. Variations in the procedure as described in Example 1, above, may also be used here.

*Example 3*

Cellulose glycollic acid ether of medium viscosity type and with about 1.2 acid groups per anhydroglucose unit was prepared in solution by contacting a solution of its sodium salt with a cation exchange resin in the acid or hydrogen form. Powdered, soluble cellulose glycollic acid ether was precipitated from this solution by adding alcohol with stirring. 5 grams of the powder were mixed with 20 grams of the aged and shredded oxycellulose of Example 2 and the mixture exposed to saturated water vapor until the cellulose glycollic acid ether became adhesive but not excessively softened. The mixture was then formed into a sheet and dried at low temperature. The compactness of the sheet can be controlled by the pressure applied during forming. A strong, absorbent, flexible sheet was formed which had good hemostatic properties, was compact and was readily absorbed in animal tissue. Desirably the cellulose glycollic acid ether in the composition is insolubilized either by warming, by intensive drying or by contact with alcohol or concentrated alcohol-water solution; although usually merely standing in a normally dry atmosphere for a period of time will insolubilize the cellulose glycollic acid ether. The powdered, soluble cellulose glycollic acid ether can aso be made by other methods, for example by washing its powdered sodium salt with alcoholic HCl and it can be dried at low temperature or even washed with anhydrous alcohol without causing immediate insolubilization. Other bonding agents can be used with the oxycellulose as illustrated in Example 1.

I may also use a film or sponge of the types of material 1 have used as bonding agents, for example, cellulose glycollic acid ethers or their sodium salts, cellulose hydrogen sulfates or their sodium salts or polyvinyl alcohol; such a film or sponge which may contain plasticizers and/or salts and/or other additives as described, being dried to the point where it is firm yet adhesive but not soft enough to largely penetrate and/or completely cover the surface of my hemostatic materials which I apply to the surface of the film or sponge to form an absorbent mat over the surface. As hemostatic agent for this use I may use the powdered, shredded or fibrous cellulose glycollic acid ethers, cellulose hydrogen sulfates or oxidized cellulose.

As a binder or film or sponge backing for my hemostatic materials I may also use gelatin and, after the bonding is accomplished, the gelatin may be treated with formaldehyde to make it less readily soluble, or instead of gelatin I may use starch or mixtures of starch and gelatin in the form of a film or sponge. A sponge may be made by freeze-drying a solution or by drying a foam. When I use polyvinyl alcohol as a binder or film I may also give it a mild treatment with formaldehyde so as to reduce its solubility. As binder or backing for my hemostatic materials I may also use the soluble forms of cellulose glycollic acid ethers or cellulose hydrogen sulfates, which are then insolubilized by converting them to their aluminum, calcium, iron or other heavy metal salts.

As a storage medium for my hemostatic preparations, in addition to the alcohol-water mixtures mentioned, I may use, for example, ethyl ether containing from 0.5 to 1.5 grams of water per 100 ml. ether. Such storage media assist in maintaining flexibility, moisture content and hemostatic activity of my materials in storage over long periods of time.

My methods of bonding absorbent materials as described, without destroying their absorbency, may be applied generally to absorbent materials such as cotton, wood cellulose, rayon, etc.

In the case of the cellulose glycollic acid ethers, I find that their hemostatic action is improved with increase in the number of acid groups per anhydroglucose unit and with decrease in molecular weight within the useful range; for example, a high viscosity material with 1.2 acid groups per unit is less active than a low viscosity material with the same degree of substitution and a medium viscosity material with 0.7 acid groups per unit is less active than with 1.2 acid groups per unit. Similarly with the cellulose hydrogen sulfates, I prefer a material with from 1 to 3 acid groups per unit and with molecular weight or chain length in the lower range so long as the material is not too quickly soluble.

In using the cellulose acid ethers or cellulose acid sulfates as hemostatic agents or even as bonding agents, I prefer to admix other materials with them. In the case of the acid ethers I find that they tend to lose their hemostatic properties under certain circumstances upon aging; furthermore they tend to become brittle. The acid sulfates, especially if they are highly acid (have a high degree of substitution by acid groups) tend to seriously degrade or decompose upon long aging. I thus prefer to have at least a proportion of the sodium salt of the acid ether or the acid sulfate present, say about 10% and not more than 50%. In order to prevent brittleness, I use a plasticizer such as glycerin, sorbitol, propylene glycol or other polyol. However, I prefer to use as plasticizer a polyethylene glycol, a polypropylene glycol or a methoxy polyethylene glycol since these compounds, especially those of higher molecular weight, are not as hygroscopic as glycerin and thus do not so readily absorb moisture to the point of reducing the absorptiveness of the product, and I may use a solid polyglycol so as not to fill the capillary spaces with a liquid plasticizer. Such polyglycols usually have a molecular weight of about 600 or above. I may also use a mixture of a solid and a liquid polyglycol. Such plasticizers also improve the adherence to the tissues and the wettability of the product as well as improving flexibility and aging properties. In the case of the acid sulfates particularly, I find that the addition of 10 to 20% of urea is effective especially as a stabilizer. Unlike polyvinyl alcohol, which can also be used as a plasticizer, the polyglycols do not interfere with clotting of the blood when they dissolve out in contact with the tissues. The polyglycols can also be used in mixture with any of my hemostatic agents to make pastes or, in the case of the solid polyglycols, waxy materials in stick or sheet form to be used as hemostats.

As a further example of an effective hemostatic material, I give the following Example 4.

*Example 4*

40 cc. of a 2% aqueous solution of cellulose glycollic acid ether (made by ion exchange from its sodium salt of medium viscosity and a degree of substitution of 1.2— Hercules Powder Company cellulose gum 120M) were added dropwise to a suspension of 5 grams oxycellulose that had been degraded to the point of brittleness by room temperature aging, powdered and added to 200 cc. of isopropyl alcohol. The suspension was vigorously stirred as the acid ether solution was added. The excess solvent was decanted from the oxycellulose and the precipitated acid ether. To the solids were added about 3 cc. of polyethylene glycol of molecular weight about 400. The product was spread on a glass plate and dried at room temperature of about 70 to 80° F. and about 50 to 60 percent relative humidity. A strong, well bonded, absorbent, readily wettable product about ¾ inch by 3 inches was obtained. This product had good hemostatic properties when tested with human blood and maintained its desirable properties over a long period of time. It also was resorbed in animal tissue within a period of 2 weeks without abscess formation. The nature and amount of plasticizer may be varied as indicated hereinbefore. Also the 2% cellulose glycollic acid ether solution may be diluted with ethyl alcohol before adding it to the suspension of oxycellulose in the isopropyl alcohol in order to precipitate a more finely divided acid ether. The acid ether may be varied in proportion and nature, for example, a high viscosity product with lower degree of substitution may be used principally for its bonding action rather than for its contribution to the hemostatic action of the product. The acid ether solution may even be diluted with a small proportion of isopropyl alcohol without premature precipitation. This gives a drier, finer precipitate. In spite of the presence of the plasticizer, the acid ether becomes insolubilized upon standing in moderately dry atmosphere—usually this occurs whenever the moisture content of the acid ether is reduced below about 14% as for example, when it is dried at about 77° F. and 50% relative humidity. In place of cellulose glycollic acid ether I may use hydroxyethyl cellulose glycollic acid ether, or cellulose hydroxypropionic acid ether. As a matter of fact I may directly impregnate the oxycellulose with a water-ethyl alcohol solution of the acid ether containing plasticizer, since when sufficiently dry the acid ether is water wettable and water absorbent, although not so much so as the dried oxycellulose. Of course, the product before drying may be compressed and compacted to strengthen it.

Generally, in place of cellulose acid sulfate I may use cellulose acid phosphate made by the action of polyphosphates on alkali cellulose. For example, a water slurry of alkali cellulose is treated in the cold or at a temperature below 100° C. with phosphorus oxychloride. The product is acidified with HCl and thoroughly washed with water. Otherwise the alkali cellulose can be treated with phosphorus oxychloride in the dry state, keeping the reacting mixture in contact with powdered sodium carbonate. The product is similarly acidified and washed. Another method of making the cellulose acid phosphate is to treat alkali cellulose with a solution of sodium trimetaphosphate and sodium carbonate. Other polyphosphates can also be used. After reaction has taken place, the product is acidified and washed with water. The acid phosphate of cellulose may be precipitated with alcohol when obtained in solution or with strong HCl and generally treated as with cellulose acid sulfate.

In place of the oxycellulose used in Example 4, powdered or fibrous cellulose acid ethers may be used as the hemostatic agent after insolubilization. I may also use the methods described to bond my hemostatic agents to gauze or other backing material. Or I may make a film of an acid ether by evaporation of an aqueous solution and, before the film is completely dry and is still adhesive but not soft enough to impregnate and fill the capillary spaces of my hemostatic agent, I may cover the surface of the film with my hemostatic agent in fibrous or powdered form using either oxycellulose or cellulose acid sulfate or a cellulose acid ether. There is thus formed a tissue-absorbable backing with an absorbent surface of hemostatic agent. The backing film may be of spongy structure and may contain plasticizers as described or other additives as described. If gauze or other material is used as backing which is not resorbable in animal tissue, an adhesive may be used that softens in the tissue fluids so that the gauze may be stripped from the hemostatic agent after use in the tissues. For example, the adhesive may be polyvinyl alcohol, a cellulose acid sulfate or cellulose acid phosphate.

Another form of hemostatic preparation I have found advantageous is a finally powdered, degraded oxycellulose, powdered cellulose glycollic acid ether, acid sulfate or acid phosphate in an aerosol dispenser. The powdered hemostatic agent is placed in a container with an aerosol propellant under pressure. The powdered hemostatic agent is thus sprayed on the bleeding area. The force of the stream of propellant imbeds the powdered hemostatic agent into the tissues and the cooling effect of the propellant as it evaporates given excellent hemostasis. With the powdered hemostatic agent in the aerosol can I may use plasticizers and other additives as I have described, except that the powder must not agglomerate in the dispenser. I may thus use a solid polyglycol plasticizer. If I wish to form an agglomerate on the wound, I use a solid polyglycol to plasticize the hemostatic agent and a liquid polyglycol plasticizer that is soluble in the propellant. I may also use glycerin or other polyol as plasticizer to avoid agglomeration of the powder in the dispenser. If the powder is fine and contains a distribution of particle sizes and if the outlet valve of the dispenser is a seating type like a poppet valve and not a slide valve, the powder will not clog the valve and the powder will not agglomerate in the dispenser. If it is desired by such means merely to cover the wound without causing hemostasis, the powder may contain a proportion of an anti-clotting agent—polyvinyl alcohol is excellent for this purpose since in the dry aerosol propellant it is not adhesive to cause agglomeration of the powder, it will bond the powder on the wound at it is softened by the tissue fluids and will prevent hemostasis as it dissolves in the tissue fluids.

Another type of resorbable backing material may be made as follows. Cellulose fabric or thread, particularly that made from regenerated cellulose fibers, is subjected to a slight oxidizing action in order to produce so-called "reaction centers" but not to appreciably weaken the fibers. Suitable oxidizing agents are permanganate, hypochlorite, hydrogen peroxide, $NO_2$, etc. The so treated material is then impregnated with a solution of a salt of iron, cerium, chromium, manganese or mixtures of same. The so impregnated cellulose is then treated with an alkaline solution to produce in the fibers an essentially insoluble oxide, hydroxide or hydrated oxide of the metal. The so treated material is then thoroughly washed with distilled water in order to thoroughly peptize the so produced precipitate throughout the cellulose. Specifically, the cellulosic material may be soaked in a solution of potassium permanganate and ferric chloride; then padded in a dilute solution of sodium hydroxide in order to precipitate the insoluble hydroxides of manganese and iron. The material is then thoroughly washed in distilled water and dried. The so produced material may be coated or impregnated with a solution of cellulose glycollic acid ether in order to give an improved finish and to improve its strength after the cellulose glycollic acid ether is insolubilized by drying or warming. Such a material when imbedded in animal tissue will oxidize and disintegrate in a period of time. Otherwise the material may be impregnated with a solution of sodium carboxymethyl cellulose and treated with an iron salt solution to form on the fibers the insoluble iron salt of cellulose glycollic acid ether. The material may be stored before use in the dry state, preferably in the absence of oxygen, or in an anhydrous solvent and/or in the presence of an anti-oxidant like ascorbic acid that will dissolve out in the tissues.

In order to permit my hemostatic compositions to be readily released from bleeding tissue or to prevent their sticking to the surgeon's glove, they may be coated with glycerin, propylene glycol, sorbitol or other polyol on one or both sides.

In using oxidized cellulose of the type described, I prefer material that has been oxidized with $NO_2$ to the point where the cellulose contains approximately one carboxyl group per anhydroglucose unit, but I prefer that the product contain no nitro groups such as are produced by the nitration of cellulose with nitric acid. Upon degradation of such a material by aging and/or heat, I obtain a product with excellent hemostatic action, good tissue resorption and a minimum of irritating and/or toxic reaction in animal tissue.

It is understood that my hemostatic compositions may be in the form of a film, a sheet, a sponge, a dried foam or, in case of the water soluble material they may be freeze-dried to produce a spongy structure. It should also be pointed out that in the bonding together of oxidized cellulose, degraded and brittle oxidized cellulose and other solid hemostatic agents, I have provided methods in general for getting them into useable forms with adequate strength and flexibility wherein they are not prevented from rapidly and intimately contacting the blood, wherein the bonding agents are not rapidly softened in use to destroy the bonding action, wherein effective and physiologically suitable hemostatic agents can be used and wherein ingredients are not present to interfere with the clotting action of the hemostatic agents, for example, by dissolving in the blood and acting as anti-coagulants before the hemostatic agent can cause a clot to form. Other bonding or supporting materials could be starch, starch insolubilized by formaldehyde or epichlorhydrin or by forming phosphate esters after the bond is formed by softened starch particles or by swelled particles of the non-gelling starch compound; similarly softened gelatin particles can be used and insolubilized by a mild treatment with formaldehyde. In using additions of foreign materials to my hemostatic agents in order to hinder crystallization as the hydrated material is dried, usually 5 to 20% is enough. As a specific example of an aerosol propellant I have used, I cite a mixture of 65% Freon 11 and 35% Freon 12—products made by E. I. du Pont de Nemours & Co.

It should be pointed out that the acidic cellulose compounds which are of interest in making my hemostatic compositions are of moderately high molecular weight and because of this and my method of drying and/or heating them, they are distinguished from those of the prior art in that they are not rapidly dissolved. For example, the cellulose hydrogen sulfate compounds of the prior art have in some cases been shown to have anticoagulant properties. This is because they are quickly dissolved to form colloidal solutions in contact with tissue and other aqueous fluids. This anti-coagulant property of certain colloidal solutions is well known. Even the presently used hemostatic material, cellulose oxidized with $NO_2$ by the method of U.S. Patent No. 2,232,990 where presumably a carboxyl group is formed by the oxidation of an hydroxyl group on the anhydroglucose unit of the cellulose structure, loses its hemostatic action when dissolved. It should be remarked also that specification of the viscosity of a solution of these acidic cellulose compounds obviously does not define a unique distribution of molecular species in the solution since clearly a solution of a complex mixture of molecular species, as always obtains in such solutions, can be made up in many different ways to give a specified viscosity. For example, a solution of medium viscosity can be composed of material of medium molecular weight or of a mixture of high and low molecular weight material.

There are several ways of reacting cellulose to attach an acid sulfate group. Presumably this is an esterification reaction between the acid used and an hydroxyl group on the anhydroglucose unit of the cellulose. However, the cellulose hydrogen sulfate compounds of the present invention are far more stable as regards hydrolysis and saponification than is characteristic of esters as they are generally known. For example, boiling with concentrated HCl is required in order to produce appreciable amounts of sulfuric acid by hydrolysis of them. In making these compounds, it is of course necessary not to largely decompose or degrade the cellulose. Suitable methods are disclosed in U.S. Patents Nos. 2,025,073; 1,734,291; 2,559,914; 2,675,377 and 2,539,451. These methods comprise reacting a purified (de-waxed and de-proteinized) cellulose with (1) chlorsulfonic acid diluted with a tertiary amine or pyridine, (2) pyrosulfuric acid diluted with a tertiary amine, (3) chlorsulfonic acid and sulfuric acid diluted with a tertiary amine or pyridine, (4) concentrated sulfuric acid diluted with butyl alcohol, (5) concentrated sulfuric acid diluted with an alcohol and sulfur dioxide in the liquid state, (6) concentrated sulfuric acid and ammonium sulfate diluted with an alcohol.

The cellulose acid ether compounds are formed by reaction of alkali cellulose with chloracetic acid, chlorpropionic acid, etc., or with the sodium salts of such acids.

In any case, the acid forms of these cellulose compounds may be made from their salts by dialysis either as such or acidified with HCl. Or they may be precipitated from solutions of their salts with concentrated HCl—in fibrous form if the solution of their salt is sufficiently concentrated. Also the acid forms are readily made by contact of their salts in solution, with a cation exchange material in the acid or hydrogen form. The acid forms may also be made from their salts by washing with alcohol-HCl mixture.

The acid sulfates, acid ethers and acid phosphates of cellulose may contain from 0.5 to 3.0 acid groups per anhydroglucose unit and the acid groups may be partially converted to salts—the sodium salt for example. I may also use compounds with mixtures of these acid groups substituted on the anhydroglucose units.

My hemostatic compounds may also be used to impregnate or coat surgical cotton, gauze or other woven or matted fabric. As indicated they may be in the form of thin films, dried foam, sponge-like material made by drying a frozen solution, extruded or precipitated in fibrous form or dried by contact with anhydrous solvents. They may be made into a thick paste or wax by mixture with polyethylene glycols or methoxy-polyethylene glycols. They may contain glycerol, sorbitol, propylene glycol or other polyol as humectants or agents to release the material from the clotted blood. They may also be mixed with sodium bicarbonate so that, when moistened, gas is evolved to cause foaming. It is also contemplated that I may use the acid ethers, acid esters and materials produced by $NO_2$ oxidation of other high molecular weight polysaccharides than cellulose—for example starch, inulin and algin. All such polysaccharide compounds must be reacted sufficiently uniformly and completely that they are essentially completely absorbed in mammalian tissue within a period of thirty days.

What I claim is:

1. A blood-wettable, blood absorptive, hemostatic surgical dressing in solid form comprising a degraded, brittle, powdered, hemostatic, $NO_2$-oxidized cellulose of from 13 to 20 percent $CO_2$ equivalency, in which is substantially uniformly dispersed a relatively water-insoluble, bonding material, absorbable in live animal tissue and selected from the class consisting of cellulose glycollic acid ether, hydroxyethyl cellulose glycollic acid ether, cellulose hydroxypropionic acid ether and mixtures thereof.

2. The product of claim 1 in which the said bonding material selected contains a minor amount of a plasticizer selected from the class consisting of glycerol, propylene glycol, sorbitol, polyethylene glycol, polypropylene glycol, methoxy-polyethylene glycol and mixtures thereof; said plasticizer selected being at least slightly soluble in water.

3. The product of claim 1 attached by the said bonding material to a fabric backing material.

4. The product of claim 3 containing a minor amount of a plasticizer selected from the class consisting of glycerol, propylene glycol, sorbitol, polyethylene glycol, polypropylene glycol, methoxy-polyethylene glycol and mixtures thereof; said plasticizer selected being at least slightly soluble in water.

5. A blood-wettable, blood-absorptive, hemostatic surgical dressing comprising a degraded, brittle, powdered, $NO_2$-oxidized cellulose of from 13 to 20 percent $CO_2$ equivalency; said $NO_2$-oxidized cellulose being embedded in the surface of a film of a relatively water-insoluble material, absorbable in live animal tissue, and selected from the class consisting of cellulose glycollic acid ether, hydroxyethyl cellulose glycollic acid ether, cellulose hydroxypropionic acid ether and mixtures thereof.

6. The product of claim 5 in which the said film contains a minor proportion of a plasticizer selected from the class consisting of glycerol, propylene glycol, sorbitol, polyethylene glycol, polypropylene glycol, methoxy-polyethylene glycol and mixtures thereof; said plasticizer selected being at least slightly soluble in water.

7. A package consisting of a pressure-tight container having a valve-controlled opening and containing a hemostatic, blood wettable, blood-absorptive, degraded, brittle, powdered, $NO_2$-oxidized cellulose of from 13 to 20 percent $CO_2$ equivalency; and a substantially inert and non-toxic, volatile, liquefied propellant.

8. A method of making a hemostatic surgical dressing which comprises in succession the steps of: (1) oxidizing cellulose with $NO_2$ under non-nitrating conditions to the point where the $CO_2$ equivalency of the product is between about 13 and about 20 percent; (2) degrading the product of step (1) by a combination of time and temperature to the point of brittleness but not to the point where it has lost its hemostatic property; (3) grinding and mixing the product of step (2); (4) impregnating the product of step (3) with an aqueous solution of a bonding material selected from the class consisting of cellulose glycollic acid ether, hydroxyethyl cellulose glycollic acid ether, cellulose hydroxypropionic acid ether and mixtures thereof; and (5) forming the product of step (4) into a desired shape and drying to impart porosity to the mass and to reduce the water solubility of the bonding material but not drying to the point where the product is no longer readily wettable by and absorptive of blood.

9. The process of claim 8 in which is added to the said aqueous solution of step (4) a minor amount of a plasticizer selected from the class consisting of glycerol, propylene glycol, sorbitol, polyethylene glycol, polypropylene glycol, methoxy-polyethylene glycol and mixtures thereof; the said plasticizer selected being at least slightly soluble in water.

10. The method of making a hemostatic surgical dressing, absorbable in live animal tissue, which comprises the steps of (1) oxidizing cellulose with $NO_2$ under non-nitrating conditions to the point where the $CO_2$ equivalency of the product is between 13 and 20 percent; (2) degrading the product of step (1) by a combination of time and temperature to the point of brittleness but not to the point where it has lost its hemostatic property; (3) grinding and mixing the product of step (2); (4) drying an aqueous solution of a material selected from the class consisting of cellulose glycollic acid ether, hydroxyethyl cellulose glycollic acid ether, cellulose hydroxypropionic acid ether and mixtures thereof to form a film of desired thickness and when said film is partially dried but still adhesive, embedding in the surface thereof the product of step (3); and (5) further drying the product of step (4) to impart porosity to the mass and to reduce the water-solubility of said film but not drying to the point where the product is no longer readily wettable by and absorptive of blood.

References Cited in the file of this patent

UNITED STATES PATENTS

| 2,232,990 | Yackel | July 15, 1938 |
| 2,423,707 | Kenyon | July 8, 1947 |
| 2,429,404 | Dixon | Oct. 21, 1947 |
| 2,430,740 | Sharples | Nov. 11, 1947 |
| 2,448,892 | Kenyon | Sept. 7, 1948 |
| 2,484,637 | Mattocks | Oct. 11, 1949 |
| 2,496,797 | Kenyon | Feb. 7, 1950 |
| 2,508,433 | Snyder | May, 23, 1950 |
| 2,517,772 | Doub | Aug. 8, 1950 |
| 2,559,914 | Frank | July 10, 1951 |
| 2,772,999 | Masci | Dec. 4, 1956 |
| 2,773,000 | Masci | Dec. 4, 1956 |
| 2,914,444 | Smith | Nov. 24, 1959 |

FOREIGN PATENTS

| 490,432 | Great Britain | Aug. 15, 1938 |
| 714,870 | Germany | Dec. 9, 1941 |

OTHER REFERENCES

Modern Packaging, 28: 1, September 1954, pp. 100, 101, 213, 214.

Hollabaugh: Ind. & Eng. Chem., 37: 6, October 1945, pp. 943–497.